Dec. 11, 1923.  
C. NOËL  
1,477,518  
RESILIENT TIRE FOR VEHICLE WHEELS  
Filed June 24, 1920  2 Sheets-Sheet 1
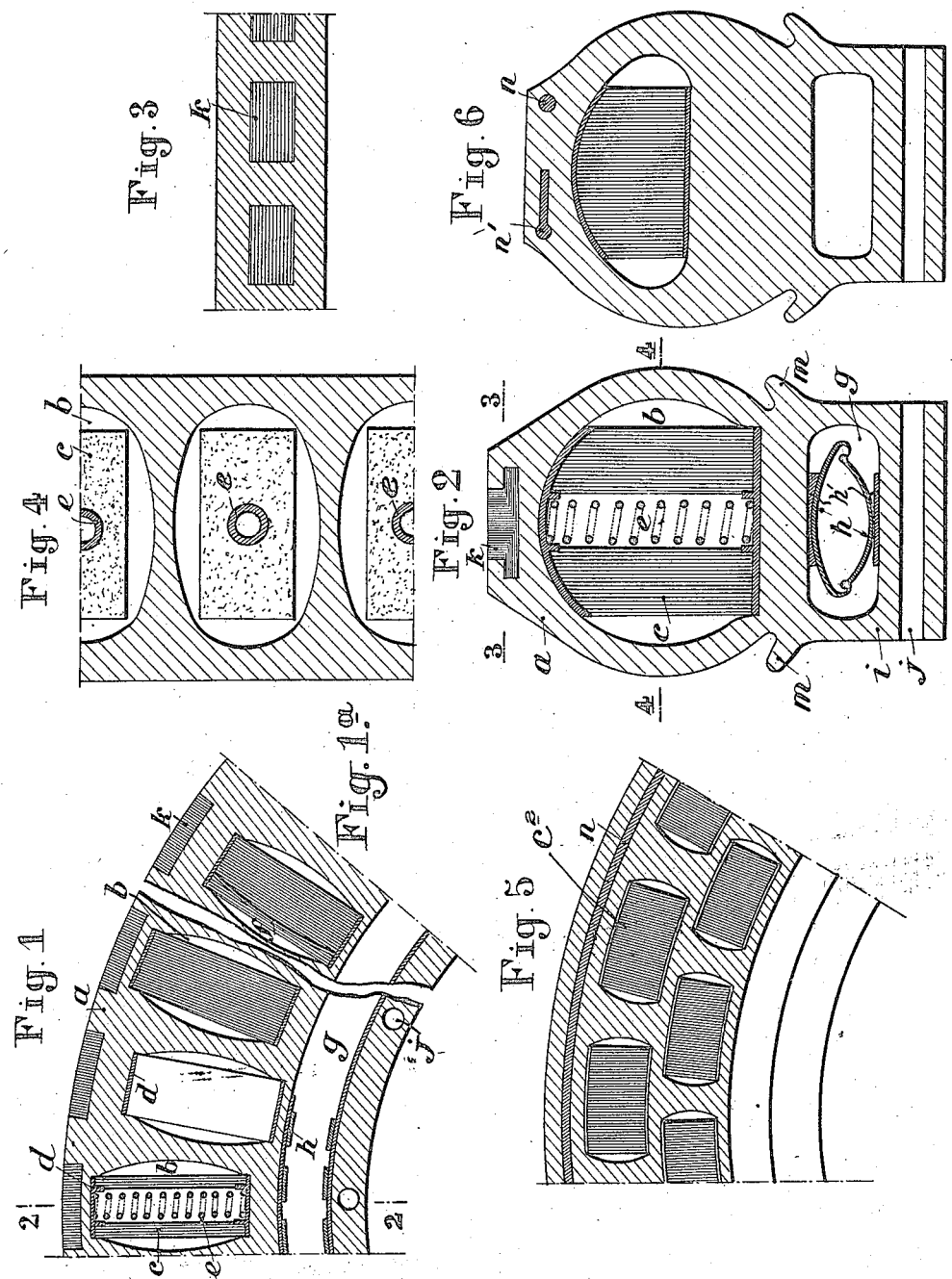
INVENTOR  
CADET NOËL  
BY  
ATTORNEYS

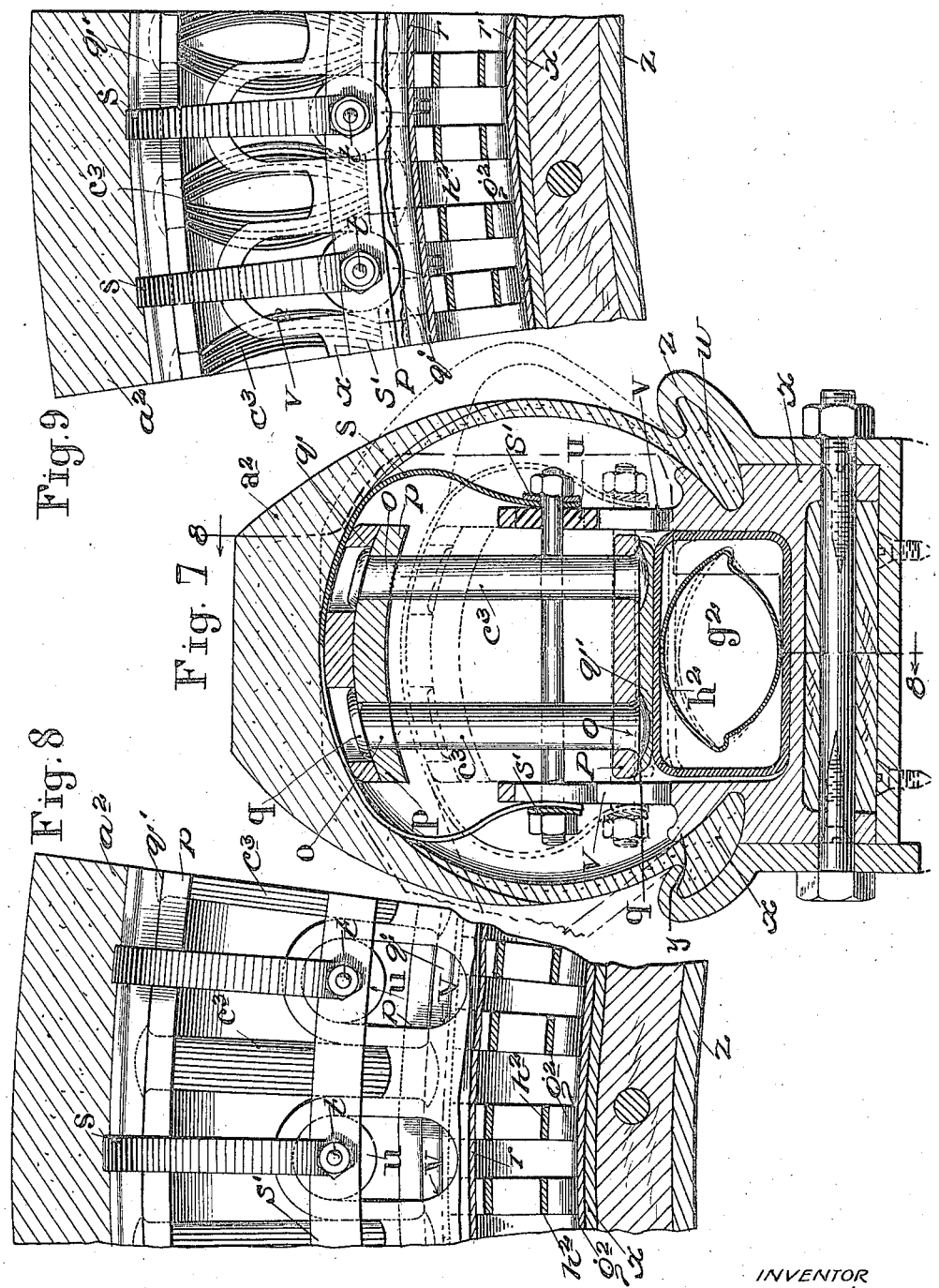

Patented Dec. 11, 1923.

1,477,518

UNITED STATES PATENT OFFICE.

CADET NOËL, OF LEVALLOIS-PERRET, FRANCE.

RESILIENT TIRE FOR VEHICLE WHEELS.

Application filed June 24, 1920. Serial No. 391,342.

*To all whom it may concern:*

Be it known that I, CADET NOËL, a citizen of the French Republic, and residing in Levallois-Perret, Seine, 35 Rue Gravel, France, have invented certain new and useful Improvements in and Relating to Resilient Tires for Vehicle Wheels, of which the following is a complete specification.

This invention relates to resilient tires for the wheels of motor- and other cars, and has for its object a resilient tire of that kind utilizing the resilient properties of animal, vegetable, mineral and other fibres under the form of bristles, horse hair, nervous material, blades or threads of wood of cellulose, of various metals or minerals conveniently arranged, the resilient action of such fibres being used either alone or in combination with springs, or any other elastic bodies.

In the accompanying drawings which show several embodiments of the invention:

Fig. 1 is a longitudinal section of a part of a tire.

Fig. 1ª is a detail sectional view of a modification.

Fig. 2 is a cross-section on the line 2—2 of Fig. 1.

Fig. 3 is a section on the line 3—3 of Fig. 2.

Fig. 4 is a section about the line 4—4 of Fig. 2.

Figs. 5 and 6 are a longitudinal section and a transverse section respectively of a modification.

Figure 7 is a cross section of another modification. Figure 8 is a section on the line 8—8 of Figure 7. Figure 9 is a similar section showing the parts in a different position.

In the constructional form of Figs. 1 to 4, the tire comprises a body $a$ for instance of india-rubber, artificial india-rubber or any other material which may have strengthening members such as bands of canvas embedded in the body of the tire. Provided in the internal part of the body are chambers $b$ arranged on either side of the longitudinal axis of the tire as shown in Fig. 2 and in each chamber is arranged a resilient member constituted by one or several bundles $c$ each comprising animal, vegetable or mineral fibres, which fibres may be for instance bristles of animals, arranged in a general radial direction the elements of every bundle being bound together in a convenient point of their length for instance at their ends in order to constitute a homogenous structure while they are maintained at a distance from one another, in order to keep the elasticity of every fibre, thus permitting every fibre to act independently when receiving a shock or a pressure. Each bundle $c$ is held in a frame $d$ and is provided with a central opening in which is an elastic member such as a spring $e$. Such member may also be given the shape of a blade spring $f$ as shown in Figure 1ª. For the said spring a block of a suitable elastic substance, such as for instance india-rubber, either natural or artificial could be substituted. The bundles of fibres are preferably staggered as shown in Figure 1.

Positioned inside the body $a$ is a circular channel $g$ extending a part of the width of the said body and constituting a pneumatic chamber provided with metal springs $h$ or any similar members, which rest against band-like members $h'$ in the channel. The inner portion $i$ of the body is provided with holes $j$ for its fixation onto a rim of a wheel of convenient construction.

Provided on the circular rolling part of the body are wear blocks $k$ made of a convenient substance such as for instance fibres embedded in the body. Circular projections $m$ may also be provided for the fixation of the tire in a metallic felloe.

The said tire being mounted on a wheel of a vehicle, the weight of the said vehicle, at the point of contact with the ground, causes the fibres of the bundles $c$ to be bent, the bundles thus undergoing a spindle-shaped deformation, and resiliently holding the vehicle. During the rotation of the wheel, the several groups of bundles $c$ undergo by turn the said deformation, but as soon as a bundle leaves the lower position in which it is holding the weight of the vehicle, the spring $e$, acting as a recovering member, brings back the fibres to their rectilinear position shown in Fig. 1.

The said fibres act in the same manner for supporting the shocks and jolting during the travelling of a vehicle, such being bent when submitted to a shock or jolting, and then brought back to their original rectilinear position by the springs $e$.

Instead of the arrangement of Figs. 1 to 4, the bundles $c^2$ could, as shown by Fig. 5, be arranged into two rows one above the other, and conveniently alternated. The whole of the tire may also be reinforced by embedding into the body of the same, in the vicinity of the external surface, a reinforcing member or members for instance of metal. In Figure 6 two reinforcing members are shown, one in the form of a rod $n$ and the other a band $n'$. The bundles may also be arranged in any convenient position, the structure of such bundles, of course varying according to the weight of the vehicle on which they are to be applied. The circular chamber or channel may be dispensed with, or the said chamber or channed $g$ may be rendered air tight and filled up with a convenient gas under pressure in order to increase the elasticity of the tire.

In the constructional form of Figs. 7, 8 and 9, the body $a^2$ of the tire receives the form of an usual cover of pneumatic tire receiving in its inside the members intending to absorb the shocks.

The animal, vegetable or mineral fibres which may be for instance bristles, in the shape of bundles $c^3$ for instance cylindrical in shape, provided at their ends with binding rings or sleeves $o$ are arranged in openings in the bands $p$ for instance of wood. The binding sleeves or rings $o'$ are provided with heads $q$ embedded in bands $q'$ made of a suitable substance, preferably moulded. The bundles $c^3$ and bands $p$, $q$ constitutes a first deadening means, held on the one hand at its external part by the internal wall of the cover $a^2$, and with its internal part bearing on the circumferential wall $r$ of the chamber $g^2$ in which are provided blade springs $h^2$, such chamber $g^2$ constituting, as above stated, a pneumatic chamber which forms with the springs $h^2$ the second deadening member.

Arranged on the internal surface of the elastic tire $a^2$ are leaf springs $s$, which are approximately horse-shoe shape and extend from side to side of the tire. The ends of the springs $s$ are provided with rollers $u$, which work in guide slots $v$ provided on the upper part of the body $x$. The ends of the springs $s$ are connected by a flexible strip $s'$ arranged between the ends of the springs and the heads of the spindles $t$ of the rollers. The said part $x$ has an internal chamber $g^2$ and abutments $y$ which act as holding devices for the circular edges $w$ of the cover which are secured by the edges $z$ of a removable rim tightened by convenient bolts of any type.

The operation of the said tire is as follows:

During the operation of the wheel, the weight of the vehicle is being held only by the fibres $c$ the elasticity of which is calculated in such a way as to let the same come in operation only for deadening the light jolting during the travelling. The parts are then in the position shown in Figure 8. Should stronger shocks take place, the bundles $c$ of fibres become bent thus transmitting to the chamber $g$ the stresses they are receiving, and which are thus absorbed and deadened, either completely or in part, by the pneumatic chamber $g$ and the springs $h$.

Should the said springs not be sufficient to absorb the said shocks and prevent the same from being transmitted to the hub of the wheel, the deformation of the tire which is thus produced, as shown in dotted lines in Figure 7 brings the rollers $u$ to the bottom of their guiding grooves $v$, as shown in Figure 7, so that the springs $s$ are put in operation by turn, thus insuring the smoothness of the rolling together with the absorption of the shocks and jolting through the parts on the very points where such shocks are taking place, so that the hub of the wheel is in no way injured by such shocks. The arrangement of the resilient elements permitting the same coming into operation only successively or by turn, provides for a great smoothness of rolling, since, in the normal position, the bundles $c$ only are operating, and since the strength of the said bundles is accordingly calculated.

The distribution of the stresses could be effected in any other way than that shown on the accompanying drawings, and the size of the bundles will vary according to the weight of the vehicle and to the result to be obtained.

The flexible bundles can be used in the construction of a shock-absorber and as is obvious may also be used in the construction of buffers or similar devices.

What I claim is:

1. An elastic and chambered tire having a plurality of radially disposed bundles of fibres arranged therein and wholly enclosed thereby.

2. An elastic tire for vehicle wheels having arranged in a chamber therein a plurality of radially disposed bundles of fibres, and elastic means for restoring the fibres to normal position after deformation.

3. An elastic tire for vehicle wheels, having arranged in a chamber therein a plurality of radially disposed bundles of bristles, and springs for returning the bundles to normal position after deformation.

4. An elastic tire for vehicle wheels, comprising a chambered body having an annular air chamber, a plurality of bundles of fibres arranged radially in the chambered portion of the body, springs for restoring the fibres to normal position after deformation, and springs in the annular air chamber.

5. An elastic tire for vehicle wheels, comprising a chambered body having an annular air chamber, a plurality of bundles of fibres, means for supporting the ends of the bundles of fibres so as to hold them radially, springs for restoring the fibres to normal position after deformation, and elliptical springs in the air chamber.

6. An elastic tire for vehicle wheels, comprising a body provided with guide slots, a cover secured to the body, a plurality of bundles of fibres in the cover, means for supporting the said bundles radially, springs arranged between the bundle supporting means and the cover, and rollers carried by the ends of the springs and working in the guide slots of the body.

7. An elastic tire for vehicle wheels comprising a body having an annular air chamber and guide slots, a cover secured to the body, a plurality of bundles of fibres enclosed by the cover, means for supporting the ends of the bundles of fibres, with the bundles radially arranged, one of the supporting means resting upon the outer wall of the air chamber, springs extending between the other supporting means and the cover, rollers mounted in the ends of the springs and working in the guide slots, and springs in the air chamber.

8. An elastic tire for vehicles, comprising a body having an air chamber in its outer face and provided with slotted projections, a cover secured to the body, a plurality of bundles of fibres in the cover, means for supporting the ends of the bundles of fibres, with the bundles radially arranged, the inner supporting means resting upon the said air chamber, springs extending between the outer supporting means and the cover, rollers carried by the ends of the springs and working in the slots of said body, and means connecting the several springs.

In testimony whereof I have hereunto set my hand at Paris, France, this 10th day of June, 1920.

CADET NOÊL.